(12) United States Patent
Kannan et al.

(10) Patent No.: US 9,696,787 B2
(45) Date of Patent: Jul. 4, 2017

(54) DYNAMIC CONTROL OF PROCESSORS TO REDUCE THERMAL AND POWER COSTS

(71) Applicant: Qualcomm Innovation Center, Inc., San Diego, CA (US)

(72) Inventors: Saravana Krishnan Kannan, San Diego, CA (US); Junjie Wu, San Diego, CA (US)

(73) Assignee: QUALCOMM Innovation Center, Inc., San Diego, CA (US)

(*) Notice: Subject to any disclaimer, the term of this patent is extended or adjusted under 35 U.S.C. 154(b) by 1 day.

(21) Appl. No.: 14/962,187

(22) Filed: Dec. 8, 2015

(65) Prior Publication Data
US 2016/0170470 A1 Jun. 16, 2016

Related U.S. Application Data

(60) Provisional application No. 62/090,249, filed on Dec. 10, 2014.

(51) Int. Cl.
*G06F 9/00* (2006.01)
*G06F 1/32* (2006.01)
*G06F 9/50* (2006.01)
*G06F 1/20* (2006.01)

(52) U.S. Cl.
CPC ............ *G06F 1/3234* (2013.01); *G06F 1/324* (2013.01); *G06F 1/329* (2013.01); *G06F 1/3287* (2013.01); *G06F 9/5094* (2013.01); *G06F 1/206* (2013.01); *Y02B 60/1275* (2013.01)

(58) Field of Classification Search
CPC ...... G06F 1/3234; G06F 1/324; G06F 1/3287; G06F 1/329; G06F 9/5094; G06F 1/206; Y02B 60/1275
USPC ............ 713/324, 323, 300, 320, 1; 718/104; 370/229
See application file for complete search history.

(56) References Cited

U.S. PATENT DOCUMENTS

| | | | | |
|---|---|---|---|---|
| 6,711,447 B1* | 3/2004 | Saeed | ........... | G06F 1/3203 700/82 |
| 7,337,303 B2* | 2/2008 | Anderson | ........... | G06F 9/3836 712/214 |
| 7,503,948 B2* | 3/2009 | Hershkowitz | ........ | B01J 19/2485 422/206 |
| 8,185,758 B2* | 5/2012 | Henroid | ............. | G06F 1/3203 713/300 |
| 8,190,930 B2* | 5/2012 | Herdrich | ............. | G06F 1/3203 710/113 |
| 8,296,773 B2* | 10/2012 | Bose | ............. | G06F 1/3203 713/300 |
| 8,484,498 B2* | 7/2013 | Branover | ............. | G06F 1/3203 713/300 |

(Continued)

*Primary Examiner* — Aurel Prifti
(74) *Attorney, Agent, or Firm* — Neugeboren O'Dowd PC

(57) ABSTRACT

Systems and methods for controlling processor cores on a computing device are disclosed. One method includes tracking a load of each of a plurality of processor cores and determining a load percentage of each of the processor cores. A core is designated as a busy core if a load percentage of the core exceeds an upper threshold, and the busy core designation is removed if the load percentage of the core drops below a lower threshold. To reduce power consumption and adverse thermal effects, no more than N+M cores are maintained online wherein N is a number of busy cores and M is generally zero, but may be increased to at least one.

19 Claims, 4 Drawing Sheets

(56) References Cited

U.S. PATENT DOCUMENTS

| | | | | |
|---|---|---|---|---|
| 8,650,426 B2* | 2/2014 | Rychlik | | G06F 1/3203 |
| | | | | 713/323 |
| 8,776,061 B2* | 7/2014 | Levin | | G06F 9/5016 |
| | | | | 370/229 |
| 9,058,173 B2* | 6/2015 | Murakami | | G06F 1/3203 |
| 9,477,533 B2* | 10/2016 | Eastep | | G06F 9/5094 |
| 9,488,998 B2* | 11/2016 | Meijer | | G05F 1/462 |
| 2002/0188877 A1* | 12/2002 | Buch | | G06F 1/3203 |
| | | | | 713/320 |
| 2005/0050310 A1* | 3/2005 | Bailey | | G06F 1/3228 |
| | | | | 713/1 |
| 2006/0026447 A1* | 2/2006 | Naveh | | G06F 1/3203 |
| | | | | 713/322 |
| 2006/0095807 A1* | 5/2006 | Grochowski | | G06F 1/206 |
| | | | | 713/324 |
| 2009/0083551 A1* | 3/2009 | Finkelstein | | G06F 1/206 |
| | | | | 713/300 |
| 2009/0228895 A1* | 9/2009 | Ding | | G06F 9/4812 |
| | | | | 718/107 |
| 2010/0095137 A1* | 4/2010 | Bieswanger | | G06F 1/3203 |
| | | | | 713/300 |
| 2010/0299541 A1* | 11/2010 | Ishikawa | | G06F 1/3228 |
| | | | | 713/300 |
| 2011/0145616 A1* | 6/2011 | Rychlik | | G06F 1/3203 |
| | | | | 713/323 |
| 2013/0227326 A1* | 8/2013 | Gwak | | G06F 1/3287 |
| | | | | 713/324 |
| 2014/0136823 A1* | 5/2014 | Ragland | | G06F 9/44505 |
| | | | | 713/1 |
| 2014/0173311 A1* | 6/2014 | Park | | G06F 1/206 |
| | | | | 713/320 |
| 2014/0380329 A1* | 12/2014 | Arora | | G06F 9/5094 |
| | | | | 718/104 |
| 2015/0007187 A1* | 1/2015 | Shows | | G06F 9/5088 |
| | | | | 718/104 |
| 2015/0025848 A1* | 1/2015 | Fukumoto | | G06F 9/5061 |
| | | | | 702/186 |
| 2015/0134982 A1* | 5/2015 | Park | | G06F 1/324 |
| | | | | 713/300 |
| 2015/0169035 A1* | 6/2015 | Allen-Ware | | G06F 1/3234 |
| | | | | 713/322 |
| 2015/0268710 A1* | 9/2015 | Bose | | G06F 9/5094 |
| | | | | 713/300 |
| 2015/0301864 A1* | 10/2015 | Tseng | | G06F 9/5011 |
| | | | | 718/104 |
| 2016/0034009 A1* | 2/2016 | Wang | | G06F 1/206 |
| | | | | 713/300 |
| 2016/0048199 A1* | 2/2016 | Kuroda | | G06F 1/3287 |
| | | | | 713/323 |
| 2016/0054782 A1* | 2/2016 | Kaburlasos | | G06F 1/3234 |
| | | | | 713/320 |
| 2016/0224100 A1* | 8/2016 | Chen | | G06F 9/5094 |

* cited by examiner

DYNAMIC CONTROL OF PROCESSORS TO REDUCE THERMAL AND POWER COSTS

CLAIM OF PRIORITY UNDER 35 U.S.C. §119

The present Application for patent claims priority to Provisional Application No. 62/090,249 entitled "DYNAMIC PROCESSING CORE CONTROL TO REDUCE THERMAL AND POWER COSTS" filed Dec. 10, 2014 and assigned to the assignee hereof and hereby expressly incorporated by reference herein.

BACKGROUND

Field

The present disclosed embodiments relate generally to computing devices, and more specifically to control of processing cores in computing devices.

Background

Computing devices including devices such as smartphones, tablet computers, gaming devices, and laptop computers are now ubiquitous. These communication devices are now capable of running a variety of applications (also referred to as "apps") and many of these devices include multiple processors to process tasks that are associated with apps. In many instances, multiple processors are integrated as a collection of processor cores within a single functional subsystem.

It is known that the processing load on a mobile device may be apportioned to the multiple cores. As an example, for load balancing purposes, a processing task may be migrated from one core to another core. In addition, cores may be brought online, so the cores are available for use (e.g., by a scheduler, interrupt handlers, etc.), and cores may be taken offline so the cores are completely unavailable for any kind of work including processes and interrupts.

In addition, it is known that processor cores may be placed into one or more sleep states when the cores are online. Although the power cost of a core may be lower in a sleep state than when a core is actively executing code, there is nonetheless a static power cost to most sleep states due to leakage that reduces battery energy and/or adversely affects thermal aspects of the subsystem.

SUMMARY

According to an aspect of the present disclosure, a method includes tracking a load of each of a plurality of processor cores and determining a load percentage of each of the processor cores. A core is designated as a busy core if a load percentage of the core exceeds an upper threshold, and the busy core designation is removed if the load percentage of the core drops below a lower threshold. To reduce power consumption and adverse thermal effects, no more than N+M cores are maintained online wherein N is a number of busy cores and M is typically zero, but M may be increased to at least one in some instances.

Another aspect of the present disclosure is a computing device that includes a plurality of processor cores, a scheduler to schedule tasks that are processed by the plurality of processor cores, and a core controller. The core controller is configured to track a load of each of the plurality of processor cores, determine a load percentage of each of the processor cores, designate a core as a busy core if a load percentage of the core exceeds an upper threshold, and remove the busy core designation if the load percentage of the core drops below a lower threshold. No more than N+M cores are maintained online wherein N is a number of busy cores, and wherein M is at least one if a number of threads exceeding a thread-threshold is greater than N, and M is zero if the number of threads exceeding the thread-threshold is less than or equal to N.

Yet another aspect of the present disclosure is a non-transitory, tangible processor readable storage medium, encoded with processor readable instructions to perform a method for controlling processor cores. The method may include tracking a load of each of a plurality of processor cores, determining a load percentage of each of the processor cores, and designating a core as a busy core if a load percentage of the core exceeds an upper threshold. The busy core designation is removed if the load percentage of the core drops below a lower threshold, and no more than N+M cores are maintained online wherein N is a number of busy cores, and wherein M is at least one if a number of threads exceeding a thread-threshold is greater than N, and M is zero if the number of threads exceeding the thread-threshold is less than or equal to N.

DETAILED DESCRIPTION

The word "exemplary" is used herein to mean "serving as an example, instance, or illustration." Any embodiment described herein as "exemplary" is not necessarily to be construed as preferred or advantageous over other embodiments. As used herein, an online core is a core that is available for use by the scheduler, interrupt handlers, etc.; an offline core is a core that is completely unavailable for any kind of work including processes and interrupts; an idle core is a core that is online, but is not executing code (e.g., an idle core may be in one or more sleep states); a cluster is a collection of one or more cores that are homogeneous and synchronous (have the same clock source); static power is the power cost of a core that comes from the leakage (that is not directly dependent on the frequency of the core); and dynamic power is the power cost of a core that comes from executing the work load—it is directly dependent on the frequency of the core. For example, an online core may have both static and dynamic power costs; an offline core will incur neither static nor dynamic power costs; and an idle core may incur static power costs.

Figure 1:
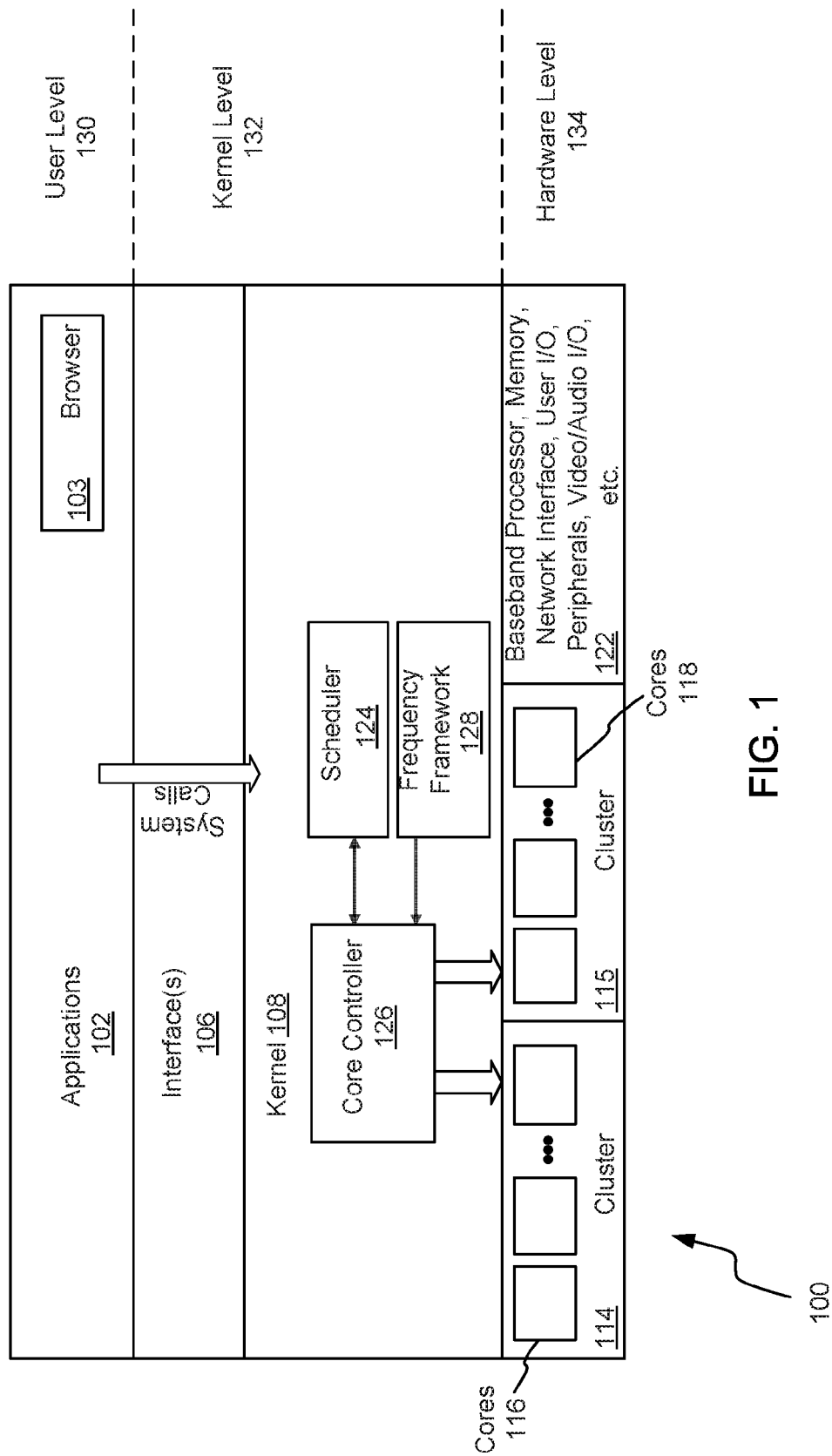
FIG. 1 is a block diagram illustrating components of a computing system.

Referring to FIG. 1, it is a block diagram illustrating components of a computing device 100 (also referred to herein as a computing device 100). The block diagram includes applications 102 (e.g., a web browser 103) at the highest level of abstraction and hardware 134, such as a first cluster 114 and a second cluster 115, at the lowest level. And each of the clusters 114, 115 includes a respective plurality of processing cores 116, 118. The kernel 108, along with interface 106, enable communication between the applications 102 and the clusters 114, 115. In particular, the interface 106 passes system calls from the applications 102 to the kernel 108, and the kernel 108 controls operations of cores 116, 118.

The one or more applications 102 may be realized by a variety of applications that operate via, or run on, one or more clusters (e.g., clusters 114, 115). For example, the one or more applications 102 may include a web browser 103 and associated plug-ins, entertainment applications (e.g., video games, video players), productivity applications (e.g., word processing, spread sheet, publishing applications, video editing, photo editing applications), core applications (e.g., phone, contacts), and augmented reality applications.

As one of ordinary skill in the art will appreciate, the user-level 130 and kernel-level 132 components depicted in FIG. 1 may be realized by hardware in connection with processor-executable code stored in a non-transitory tangible processor readable medium such as nonvolatile memory 122, and can be executed by a cluster (e.g., an app processor). Numerous variations on the embodiments herein disclosed are also possible.

As shown in FIG. 1, this embodiment includes a scheduler 124 and a core controller 126 that collectively operate to schedule tasks among the cores 116, 118 and to control a number of the cores that are offline to reduce static power costs (e.g., leakage losses). Although the scheduler 124 and core controller 126 are depicted in FIG. 1 as separate constructs, in some implementations the core controller 126 is integrated as part of the scheduler 124. The scheduler 124 generally operates to schedule tasks among the processor cores 116, 118, for example, to balance the load that is being processed, and the core controller 126 operates to reduce (e.g., minimize) the number of online cores while handling the processing load. The core controller 126 may also operate to bring additional cores online, and to determine which particular ones of the cores 116, 118 are brought online.

Also shown in FIG. 1 is a frequency framework 128, which may be utilized to determine a maximum scaling frequency of each of the cores 116, 118. As discussed further herein, the maximum scaling frequency of the cores 116, 118 may be used as a factor when determining whether a core is busy, and hence, when additional cores may be taken offline and when additional cores are needed online. For example, the frequency framework 128 may reduce the maximum scaling frequency of each of the cores when thermal aspects of the cores limit the frequency at which the cores may operate. At higher maximum scaling frequencies (e.g., when thermal affects are relatively low) the core controller 126 will be able to maintain more cores offline to meet the processing load; thus reducing static power losses associated with idle cores. Conversely, when thermal affects reduce the maximum scaling frequencies of the cores, more cores may be required to process the task load placed on the cores; thus the ability of the core controller 126 to reduce the number of online cores may be hindered. As a consequence, the efficacy of the core controller 126 to take idle cores offline is based upon the maximum scaling frequencies of the cores.

Although two clusters 114, 115 are depicted in the embodiment of FIG. 1, beneficial aspects of the invention do not require multiple clusters. But in many embodiments, multiple cores (e.g., cores 116) may form a cluster (e.g., cluster 114) in which all of the cores are homogeneous and synchronous (the cores have the same clock source). For a workload that does not fill the capacity of all cores in a cluster, having all the cores of the cluster online can result in a higher thermal and power cost than having unnecessary cores offline. In other words, keeping cores that do not contribute to increased performance of a workload offline can help reduce the thermal and power cost. When the clusters in a system on a chip (SoC) are heterogeneous, some clusters may be considered power clusters (biased for lower power) and some clusters may be considered performance clusters (biased for performance). In the embodiment depicted in FIG. 1 for example, a dual cluster heterogeneous system is depicted in which cluster 114 may be a power cluster and cluster 115 may be a performance cluster.

Figure 2:
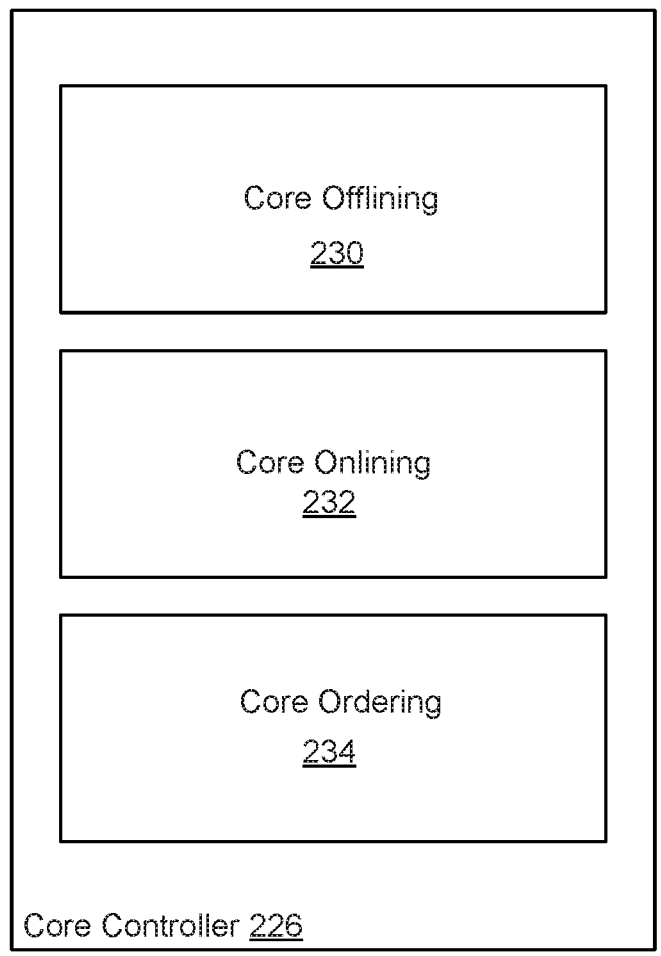
FIG. 2 is a block diagram depicting an embodiment of the core controller depicted in FIG. 1.

Referring next to FIG. 2, shown is a block diagram depicting an exemplary core controller 226 that may be used to realize the core controller 126 depicted in FIG. 1. As shown, the core controller 226 in this embodiment includes a core offlining module 230, a core onlining module 232, and a core ordering module 234.

The core offlining module 230 generally operates to reduce (e.g., minimize) the number of online cores while maintaining a sufficient number of online cores to mitigate against any loss in performance. In operation, the core offlining module 230 may track the load of a core based on the time the core is executing code or by getting the load information for the core directly from the scheduler 124 after the core is adjusted for task migration. Then the load percentage (load %) of each core may be calculated and normalized to the maximum scaling frequency obtained from the frequency framework 128 (which may be lower than maximum hardware frequency due to thermal effects, etc.).

A core may be considered as busy if the load % exceeds an upper threshold (up_threshold %). Normalizing to a maximum scaling frequency may be necessary when calculating the load % to make sure cores are not stuck as "not busy" if the core/cluster is heavily throttled due to thermal reasons. In many implementations, the core offlining module 230 takes cores offline that are not busy and maintains one core idle so that the idle core may be quickly made active if the task load demands another core to be active. And in some variations, as discussed below, no cores are maintained in an idle state in a cluster if the number of "big" threads in the device 100 is less than the N, where N is the number of busy cores in the cluster and a thread is considered a "big" thread if it consumes a threshold percent (referred to herein as a thread-threshold) of a core's maximum hardware capacity. The thread-threshold, which defines whether a thread is a "big thread," can be different for each cluster in the device 100. The thread-threshold for a cluster may be set to the same values as the upper threshold, but this is not required and the upper threshold for determining whether a core is busy may be different than the thread-threshold that is used to determine whether a thread is a big thread. Exemplary values for the upper threshold are provided below, but other values may also be used.

Once a core is marked as busy, it may be considered as "not busy" if the load % is lower than a lower threshold (down_threshold %). In some implementations, the upper threshold (up_threshold %) and lower threshold (down_threshold %) have different values, which helps to prevent a core from being brought online and offline in quick succession. In one implementation for example, the upper threshold (up_threshold %) is 60 percent and the lower threshold (down_threshold %) is 30 percent, but it is certainly contemplated that each of the thresholds may have a different value.

As briefly mentioned above, in addition to designating cores as busy or not busy, the core offlining module 230 may obtain (e.g., from the scheduler 124) an indication of how many scheduled threads in the device 100 are "big" threads that exceed a thread-threshold. More specifically, the scheduler 124 may provide an indication, for each particular cluster, of the number of globally scheduled threads that exceed a percentage of a maximum hardware capacity of a single core in that particular cluster. In these embodiments, if N cores in a cluster are busy, then the core offlining module 230 may keep cores in excess of N+M cores online, where M is a tunable parameter that is generally set to zero, but M and may be increased (e.g., to one) if the number of big threads (threads that exceed the thread-threshold) is greater than N. In other words, if the number of big threads doesn't exceed to the number of busy cores N, then M is set to zero. But if the number of big threads exceeds the number of busy cores N, then M may be set to one. This keeps a minimum of one core idle and online per cluster type if the number of big threads exceeds the number of busy cores N. And the idle number of cores M allows the scheduler 124 to quickly start using a particular type of core to run a task without incurring the long wait time of onlining a core from an offline state. When (N+M) is less than the number of online cores, the unnecessary cores may be offlined after waiting for an "offline delay" time.

As a more specific example, if there are two big threads that are maximally utilizing two cores in a four core cluster, then M is set to zero and there will only be two online and active cores in the cluster. Without utilizing information about the number of big threads being executed in a cluster, the minimum value of M needs to be one (to prophylactically prevent a potential drop in performance); thus three cores would need to be kept online, and one of these three cores would be idle and unnecessarily contributing to the thermal and power cost of the cluster.

In some embodiments, the number of active cores is maintained with a minimum and maximum number per cluster regardless of whether N+M falls outside that limit. In an embodiment that includes a "4 little+4 big cluster" system for example, the minimum number of active cores may be set to 4 for the little cluster (effectively disabling the offlining functionality for the little cluster) and the minimum number of active cores for big cluster may be set to 2. The minimum and maximum values for active cores enables another component in the system to guarantee a minimum limit on the performance (with the minimum number of active cores) or a maximum limit on the power (with the maximum number of active cores).

Also depicted in FIG. 2 is a core onlining module 232, which generally operates to bring cores online in response to an increase in a processing load. For example, when (N+M) is greater than the number of online cores in one of the clusters 114, 115, then additional cores may be onlined immediately.

Because the difficulty of parallelizing a workload becomes harder as the number of threads increases, in some modes of operation the first few cores of a cluster are quickly brought online but additional cores may be brought online more slowly. To achieve this, an array of up_threshold % and down_threshold % values may be used, and the index may be selected based on the current number of online cores. In this way, when only one core is online the up_threshold % and down_threshold % can be set aggressively low to quickly online a second core. But the up_threshold % and the down_threshold % can be set very high when two or more cores are online to allow onlining of additional cores only when the load is extremely high.

The following table provides example values for up_threshold % and down_threshold % that may be utilized based upon the number of online CPUs:

TABLE 1

| Online Cores | up_threshold % | down_threshold % |
| --- | --- | --- |
| 1 | 60 | 30 |
| 2 | 90 | 30 |
| 3 | 90 | 60 |
| 4 | 90 | 60 |

Also depicted in FIG. 2 is a core ordering module 234. In operation, the core ordering module 234 may maintain list of least recently used (LRU) offline cores, and when additional cores need to be brought online, the offline core that was least recently used may be selected. This allows for core rotation and an even spreading of the thermal impact around the cores. In addition, the core ordering module 234 may maintain a list of cores that is ordered by power cost. When additional cores need to be brought online, the least power hungry core may be selected from the power list. If there is a significant difference in the leakage characteristics of cores within a cluster, the list may be ordered during initialization based on the fixed leakage characteristics. If the temperature of cores within a cluster can vary significantly, the ordering of the list may be updated taking into account the leakage characteristics and the current temperature of the cores. When the order of the list changes, the load may be rebalanced to the most power efficient cores by forcefully offlining the power inefficient cores and onlining the power efficient cores.

Figure 3:
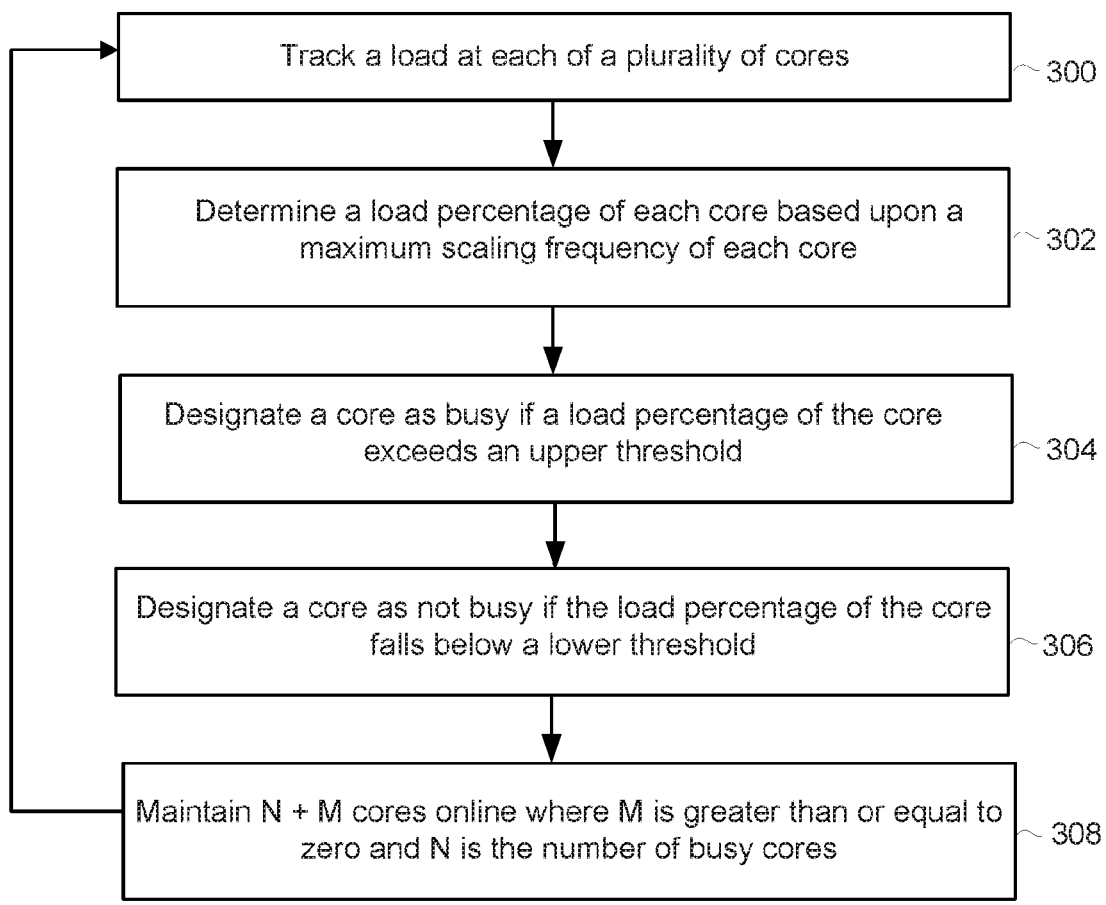
FIG. 3 is a flow chart depicting a method that may be traversed in connection with embodiments disclosed herein.

Referring next to FIG. 3, it is a flowchart depicting a method that may be traversed in connection with the embodiments depicted in FIGS. 1 and 2. As shown, the core offlining module 230 may track the load of a core (Block 300). For example, a sample window may be established, and a percent of time the core executes code within that window may be considered the load of that core. More specifically, the sample window may be 20 milliseconds, and if the core executes code during 15 milliseconds of that 20-millisecond window, the load percentage of the core is 75 percent. In some implementations, the load percentage may be obtained from a kernel-level driver (not shown) that is associated with the core's cluster. In other implementations, the load information may be obtained directly from the scheduler 124 after the core is adjusted for migration.

As depicted, the load percentage (load %) of each core may be calculated and normalized to its maximum (throttled) scaling frequency, which may be lower than the maximum frequency of the core due to thermal effects limiting the maximum operational frequency of the core (Block 302). For example, a core may optimally operate at a frequency of 2 GHz, but the frequency framework 128 may limit the frequency of the core to 1 GHz due to a temperature rise of the core. As a consequence, if a core is 50% busy at 1 GHz and its maximum scaling frequency is 2 GHz, then the load % would be computed to be 25%. However, if the maximum scaling frequency is reduced to 1 GHz, the same load would have the load % computed to be 50%.

As shown in FIG. 3, a core may be designated as "busy" if the load % (e.g., the normalized load %) exceeds an upper threshold (up_threshold %) (Block 304). Normalizing the load % to a maximum scaling frequency may be necessary to make sure cores are not stuck as "not busy" if the core/cluster is heavily throttled due to thermal issues. Once a core is marked as busy, it may be designated as "not busy" if the load % is lower than a lower threshold (down_threshold %).(Block 306). As discussed above, if N cores in a cluster are busy, then N+M cores may be kept online, where M is a tunable parameter that has values greater than or equal to zero (Block 308). As discussed above, M may be set to zero if a number of big threads is equal to the number of busy cores N. But if the number of big threads is greater than the number of busy cores, at least one additional core (M cores) may be maintained idle and online per cluster type to enable the scheduler 124 to quickly start using the idle core to run a task without incurring a high wait time to online the core.

Referring again to FIG. 3, the core controller 226 generally operates to maintain (N+M) cores online where M in many implementations is set to one if a number of threads exceeding the thread-threshold is greater than N, and M is set to zero if the number of threads exceeding the thread-threshold is less than or equal to N (Block 308). When (N+M) is greater than the number of online cores in the cluster, then additional cores may be onlined immediately. And when (N+M) is less than the number of online cores, the unnecessary cores may be offlined after waiting for an "offline delay" time. As shown in FIG. 3, the methodology depicted by Blocks 300 to 308 may repeat on an ongoing basis so that the number of online and active cores is dynamically adjusted based upon the processing load.

As discussed above, the core ordering module 234 may maintain a list of least recently used (LRU) offline cores. When additional cores need to be brought online, the offline core that was least recently used may be selected. In addition, or in the alternative, a list of cores may be maintained that is ordered by their power cost. In some implementations, the power cost of a core carries more weight (when determining which core to bring online) than the historical use of the cores so that the use history only acts to "break a tie" when selecting between two cores that have the same power cost.

Figure 4:
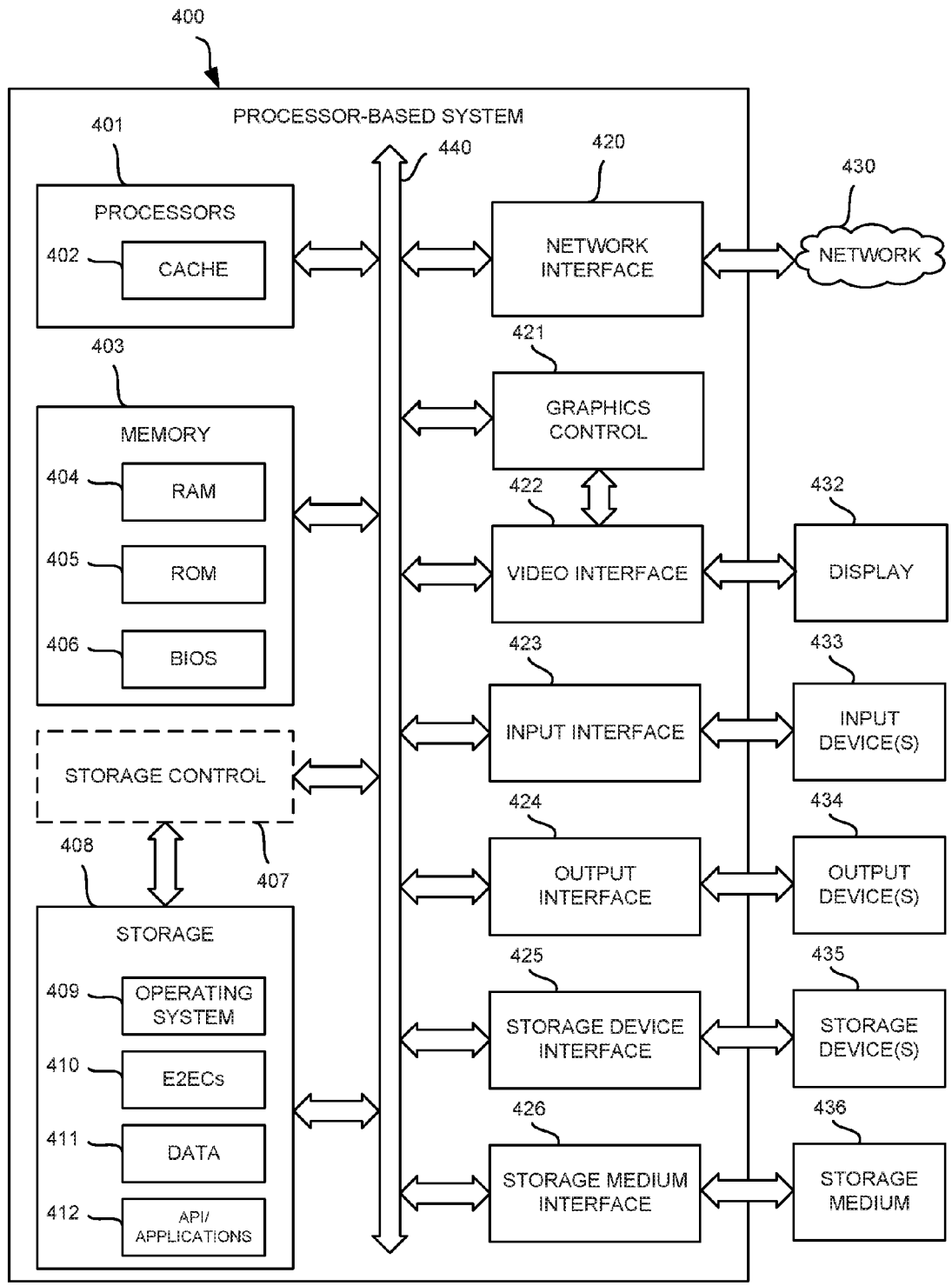
FIG. 4 is a block diagram depicting physical structures that may be utilized in connection with implementing the embodiments disclosed herein.

The systems and methods described herein can be implemented in a machine such as a processor-based system in addition to the specific physical devices described herein. FIG. 4 shows a diagrammatic representation of one embodiment of a machine in the exemplary form of a processor-based system 400 within which a set of instructions can execute for causing a device to perform or execute any one or more of the aspects and/or methodologies of the present disclosure. The components in FIG. 4 are examples only and do not limit the scope of use or functionality of any hardware, software, embedded logic component, or a combination of two or more such components implementing particular embodiments.

Processor-based system 400 may include processors 401, a memory 403, and storage 408 that communicate with each other, and with other components, via a bus 440. The bus 440 may also link a display 432 (e.g., touch screen display), one or more input devices 433 (which may, for example, include a keypad, a keyboard, a mouse, a stylus, etc.), one or more output devices 434, one or more storage devices 435, and various tangible storage media 436. All of these elements may interface directly or via one or more interfaces or adaptors to the bus 440. For instance, the various non-transitory tangible storage media 436 can interface with the bus 440 via storage medium interface 426. Processor-based system 400 may have any suitable physical form, including but not limited to one or more integrated circuits (ICs), printed circuit boards (PCBs), mobile handheld devices (such as mobile telephones or PDAs), laptop or notebook computers, distributed computer systems, computing grids, or servers.

Processors 401 (or central processing unit(s) (CPU(s))) optionally contain a cache memory unit 402 for temporary local storage of instructions, data, or computer addresses. Processor(s) 401 are configured to assist in execution of processor-executable instructions. Processor-based system 400 may provide functionality as a result of the processor(s) 401 executing software embodied in one or more tangible processor-readable storage media, such as memory 403, storage 408, storage devices 435, and/or storage medium 436. The processor-readable media may store software that implements particular embodiments, and processor(s) 401 may execute the software. Each of the processors may include multiple cores that are brought online and taken offline as disclosed herein. Memory 403 may read the software from one or more other processor-readable media (such as mass storage device(s) 435, 436) or from one or more other sources through a suitable interface, such as network interface 420. The software may cause processor(s) 401 to carry out one or more processes or one or more steps of one or more processes described or illustrated herein. Carrying out such processes or steps may include defining data structures stored in memory 403 and modifying the data structures as directed by the software.

The memory 403 may include various components (e.g., machine readable media) including, but not limited to, a random access memory component (e.g., RAM 404) (e.g., a static RAM "SRAM", a dynamic RAM "DRAM, etc.), a read-only component (e.g., ROM 405), and any combinations thereof. ROM 405 may act to communicate data and instructions unidirectionally to processor(s) 401, and RAM 404 may act to communicate data and instructions bidirectionally with processor(s) 201. ROM 405 and RAM 404 may include any suitable tangible processor-readable media described below. In one example, a basic input/output system 406 (BIOS), including basic routines that help to transfer information between elements within processor-based system 400, such as during start-up, may be stored in the memory 403.

Fixed storage 408 is connected bidirectionally to processor(s) 401, optionally through storage control unit 407. Fixed storage 408 provides additional data storage capacity and may also include any suitable tangible processor-readable media described herein. Storage 408 may be used to store operating system 409, EXECs 410 (executables), data 411, APV applications 412 (application programs), and the like. Often, although not always, storage 408 is a secondary storage medium (such as a hard disk) that is slower than primary storage (e.g., memory 403). Storage 408 can also include an optical disk drive, a solid-state memory device (e.g., flash-based systems), or a combination of any of the above. Information in storage 408 may, in appropriate cases, be incorporated as virtual memory in memory 403.

In one example, storage device(s) 435 may be removably interfaced with processor-based system 400 (e.g., via an external port connector (not shown)) via a storage device interface 425. Particularly, storage device(s) 435 and an associated machine-readable medium may provide nonvolatile and/or volatile storage of processor-executable instructions, data structures, program modules, and/or other data for the processor-based system 400. In one example, software may reside, completely or partially, within a machine-readable medium on storage device(s) 435. In another example, software may reside, completely or partially, within processor(s) 401.

Bus 440 connects a wide variety of subsystems. Herein, reference to a bus may encompass one or more digital signal lines serving a common function, where appropriate. Bus 440 may be any of several types of bus structures including, but not limited to, a memory bus, a memory controller, a peripheral bus, a local bus, and any combinations thereof, using any of a variety of bus architectures.

Processor-based system 400 may also include an input device 433. In one example, a user of processor-based system 400 may enter commands and/or other information into processor-based system 400 via input device(s) 433. Examples of an input device(s) 433 include, but are not limited to, an alpha-numeric input device (e.g., a keyboard), a pointing device (e.g., a mouse or touchpad), a touchpad, a joystick, a gamepad, an audio input device (e.g., a microphone, a voice response system, etc.), an optical scanner, a video or still image capture device (e.g., a camera), and any combinations thereof.

In particular embodiments, when processor-based system 200 is connected to network 430, processor-based system 400 may communicate with other devices, specifically mobile devices and enterprise systems, connected to network 430. Communications to and from processor-based system 400 may be sent through network interface 420. For example, network interface 220 may receive incoming communications (such as requests or responses from other devices) in the form of one or more packets (such as Internet Protocol (IP) packets) from network 430, and processor-based system 200 may store the incoming communications in memory 403 for processing. Processor-based system 400 may similarly store outgoing communications (such as requests or responses to other devices) in the form of one or more packets in memory 403 and communicated to network 430 from network interface 420. Processor(s) 401 may access these communication packets stored in memory 403 for processing.

Examples of the network interface 420 include, but are not limited to, a network interface card, a modem, and any combination thereof. Examples of a network 430 or network segment 430 include, but are not limited to, a wide area network (WAN) (e.g., the Internet, an enterprise network), a local area network (LAN) (e.g., a network associated with an office, a building, a campus or other relatively small geographic space), a telephone network, a direct connection between two computing devices, and any combinations thereof. A network, such as network 430, may employ a wired and/or a wireless mode of communication. In general, any network topology may be used.

Information and data can be displayed through a display 432. Examples of a display 422 include, but are not limited to, a liquid crystal display (LCD), an organic liquid crystal display (OLED), a cathode ray tube (CRT), a plasma display, and any combinations thereof. The display 432 can interface to the processor(s) 401, memory 403, and fixed storage 408, as well as other devices, such as input device(s) 233, via the bus 440. The display 432 is linked to the bus 440 via a video interface 422, and transport of data between the display 432 and the bus 440 can be controlled via the graphics control 421.

In addition or as an alternative, processor-based system 400 may provide functionality as a result of logic hardwired or otherwise embodied in a circuit, which may operate in place of or together with software to execute one or more processes or one or more steps of one or more processes described or illustrated herein. Reference to software in this disclosure may encompass logic, and reference to logic may encompass software. Moreover, reference to a processor-readable medium may encompass a circuit (such as an IC) storing software for execution, a circuit embodying logic for execution, or both, where appropriate. The present disclosure encompasses any suitable combination of hardware or software in connection with hardware.

Those of skill would further appreciate that the various illustrative logical blocks, modules, circuits, and algorithm steps described in connection with the embodiments disclosed herein may be implemented as electronic hardware, or hardware in connection with software. Various illustrative components, blocks, modules, circuits, and steps have been described above generally in terms of their functionality. Whether such functionality is implemented as hardware or hardware that utilizes software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method for controlling processor cores, the method comprising:
   designating a core of a plurality of processor cores as a busy core if a load percentage of the core exceeds an upper threshold;
   determining a number of the plurality of processor cores that are busy cores;

removing the busy core designation if the load percentage of the core drops below a lower threshold;

determining a number of threads globally scheduled among the plurality of processor cores that exceed a thread-threshold, wherein the thread-threshold is a percentage of a maximum hardware capacity of a single one of the plurality of processor cores; and maintaining no more than N+M cores online, wherein N is the number of busy cores, and wherein M is a number of idle cores, and wherein M is at least one if the number of threads exceeding the thread-threshold is greater than N, and M is zero if the number of threads exceeding the thread-threshold is less than or equal to N.

2. The method of claim 1, wherein tracking the load of each of the plurality of processor cores includes:

calculating a percentage of time each core is not idle during a sample window.

3. The method of claim 2, wherein a core is not idle when the core is executing code.

4. The method of claim 1, wherein the upper and lower thresholds are different thresholds.

5. The method of claim 1, including:

establishing a particular thread-threshold for each of a plurality of cluster types, and wherein values for N and M are established for each cluster type.

6. The method of claim 1, including:

obtaining a maximum scaling frequency for each of the cores, wherein determining the load percentage includes calculating the load percentage of each of the cores by normalizing the load percentage of each core to its maximum scaling frequency.

7. The method of claim 1, including:

waiting for an offline delay before offlining a particular core after the load percentage for the particular core drops below the lower threshold.

8. The method of claim 1, including:

maintaining a list of least-recently-used cores; and using the list as a factor when determining which core to bring online.

9. The method of claim 1 including:

maintaining a list of cores ordered by a power cost of each core; and selecting a core to bring online based upon its power cost.

10. A computing device comprising:

a plurality of processor cores;

a scheduler to schedule tasks that are processed by the plurality of processor cores;

a core controller configured to:

designate a core as a busy core if a load percentage of the core exceeds an upper threshold;

determine a number of the plurality of processor cores that are busy cores;

remove the busy core designation if the load percentage of the core drops below a lower threshold;

determine a number of threads globally scheduled among the plurality of processor cores that exceed a thread-threshold, wherein the thread-threshold is a percentage of a maximum hardware capacity of a single one of the plurality of processor cores; and maintain no more than N+M cores online wherein N is the number of busy cores, and wherein M is a number of idle cores, and wherein M is at least one if the number of threads exceeding a thread-threshold is greater than N, and M is zero if the number of threads exceeding the thread-threshold is less than or equal to N.

11. A non-transitory, tangible processor readable storage medium, encoded with processor readable instructions to perform a method for controlling processor cores, the method comprising:

designating a core as a busy core if the load percentage of the core exceeds an upper threshold;

determining a number of the plurality of processor cores that are busy cores;

removing the busy core designation if the load percentage of the core drops below a lower threshold;

determining a number of threads globally scheduled among the plurality of processor cores that exceed a thread-threshold, wherein the thread-threshold is a percentage of a maximum hardware capacity of a single one of the plurality of processor cores; and maintaining no more than N+M cores online, wherein N is the number of busy cores, and wherein M is a number of idle cores, and wherein M is at least one if the number of threads exceeding the thread-threshold is greater than N, and M is zero if the number of threads exceeding the thread-threshold is less than or equal to N.

12. The non-transitory, tangible processor readable storage medium of claim 11, wherein tracking the load of each of the plurality of processor cores includes:

calculating a percentage of time each core is not idle during a sample window.

13. The non-transitory, tangible processor readable storage medium of claim 12, wherein a core is not idle when the core is executing code.

14. The non-transitory, tangible processor readable storage medium of claim 11, wherein the upper and lower thresholds are different thresholds.

15. The non-transitory, tangible processor readable storage medium of claim 11, wherein M is one.

16. The non-transitory, tangible processor readable storage medium of claim 11, including:

obtaining a maximum scaling frequency for each of the cores, wherein determining the load percentage includes calculating the load percentage of each of the cores by normalizing the load percentage of each core to its maximum scaling frequency.

17. The non-transitory, tangible processor readable storage medium of claim 11, including:

waiting for an offline delay before offlining a particular core after the load percentage for the particular core drops below the lower threshold.

18. The non-transitory, tangible processor readable storage medium of claim 11, including:

maintaining a list of least-recently-used cores; and using the list as a factor when determining which core to bring online.

19. The non-transitory, tangible processor readable storage medium of claim 11 including:

maintaining a list of cores ordered by a power cost of each core; and selecting a core to bring online based upon its power cost.

* * * * *